No. 856,400. PATENTED JUNE 11, 1907.
K. C. GILLETTE.
BOTTLE SEAL.
APPLICATION FILED MAR. 9, 1906.

Attest:
Edgeworth Greene
F. Alexander

Inventor:
King C. Gillette
by Garry P. Van Wye
Atty.

UNITED STATES PATENT OFFICE.

KING C. GILLETTE, OF BOSTON, MASSACHUSETTS.

BOTTLE-SEAL.

No. 856,400.     Specification of Letters Patent.     Patented June 11, 1907.

Application filed March 9, 1906. Serial No. 305,111.

*To all whom it may concern:*

Be it known that I, KING C. GILLETTE, a citizen of the United States, residing at Boston, in the county of Suffolk and State of Massachusetts, have invented a new and useful Bottle-Seal, of which the following is a specification.

My invention relates to bottle seals, especially to that class of devices used to close bottles, or vessels containing beer, mineral water, and the like where a cheap seal is desired; and the object of this invention is to provide a seal that will be cheap to manufacture and efficient in use.

In seals of this character it is customary to use either cork, or rubber in combination with a metal cap in order to make a perfect seal, rubber being preferred on account of its cheapness; but with many liquids, such as beer, rubber is not desirable, especially the cheap grade usually used for this purpose, since the liquid will be deteriorated by contact with the rubber.

It is the object of the present invention to provide a seal so constructed that rubber can be used instead of cork, and at the same time provide means to prevent the contents of the bottle coming in contact with the rubber; a further object being to provide a device wherein but a very small sealing ring is required and at the same time provide means to hold this ring in place in the cap while being transported from the factory to the consumer, and while applying the stopper to a bottle.

The invention is illustrated in the accompanying drawing in which—

Figure 1:
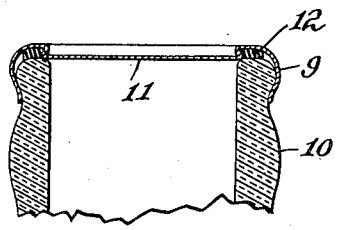
Figure 2:
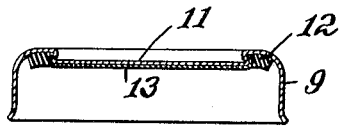
Figure 3:
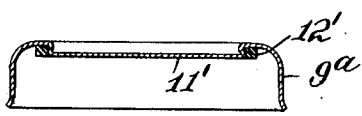
Figure 4:
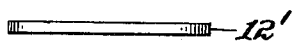
Figure 5:
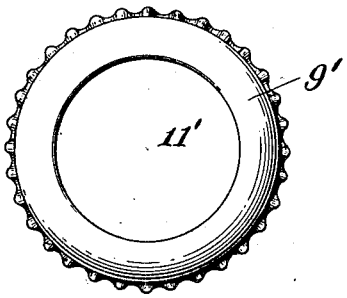
Figure 6:
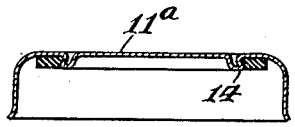
Figure 7:
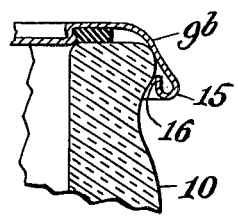
Figure 8:
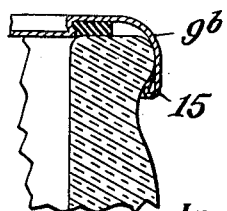

Figure 1 is a central, vertical section of my improved seal applied to a bottle; Fig. 2 is a similar view of a cap before mounting on a bottle, but showing means to prevent the contents of the bottle coming in contact with the cap; Fig. 3 is a view of a modified form of cap; Fig. 4 is an edge view of a gasket for the same; Fig. 5 is a plan view of a cap similar to Fig. 1, but having the ordinary crimped skirt; Fig. 6 is a view of a modified form of cap; Fig. 7 is a view of a cap similar to Fig. 1, showing only a portion thereof, and a portion of the neck of a bottle; and, Fig. 8 is a view of the same after being clamped in place.

In the accompanying drawing the several parts of my invention are indicated by numerals of reference; and in practice I provide a metal cap 9, which may be clamped upon a bottle 10, by spinning the skirt underneath the shoulder of the bottle as shown in Fig. 1, or the cap may have a crimped skirt, as shown in Fig. 5, which can be secured to a bottle in a manner well known.

The cap 9 is provided with a central depressed portion 11, usually formed by stamping the central part of the cap inward; a gasket 12 is then mounted on the periphery of this depressed portion, and the part 11 is then forced backward until the edges are forced outward causing the connecting portion between the part 11 and main part of the cap 9 to partly turn upon itself, as clearly shown in the drawings, thereby forming a seat for the gasket 12, and in the preferred form, clamping the gasket in this seat so that it is held quite firmly in this seat, and will not be dislodged in handling. Owing to this construction, the gasket 12 need not extend out to the skirt of the cap as would be the case where the gasket is held within the cap by the friction of the edge upon, or against the skirt of the cap, and, in consequence, a smaller gasket can be used, thereby reducing the cost of the seal.

The part 11 is proportioned in size so that it will extend over the mouth of the bottle to engage the top of the lip; and when the cap is pressed down upon the mouth of the bottle in securing the same in place, the edge of the part 11 will contact sufficiently close with the lip of the bottle to prevent the contents reaching the ring 12, while, at the same time, the ring 12 is free to engage the lip of the bottle to form a tight seal. By this construction, rubber of a very cheap grade can be used as the contents of the bottle can not come in contact with the rubber, and the ring need not be very wide in order to form a tight seal.

In the device shown in Fig. 2 a strip of paraffined cloth 13, is mounted over the part 11 of the cap, and extends around the curved edge, and is clamped between the depressed part and the gasket 12, thus preventing the contents of the bottle coming in contact with the metal cap. This construction is very desirable where the contents of the bottle would be deteriorated by contact with the metal, as beer in contact with tin, or mineral water as usually bottled, in contact with aluminium, in the latter case the water being not so much injured as the cap.

In Fig. 3 I have shown a cap 9ª, with the depressed part 11' returned only far enough to form a seat for the gasket 12', shown in Fig. 4, which may be held in this seat by the elasticity of the rubber instead of being clamped in.

In Fig. 6 the part 11ª is brought up flush with the top of the cap, the depending rib 14, being bent outward to clamp the gasket, and to contact with the lip of the bottle as in Fig. 1.

Where aluminium is used to form the metal cap it is difficult to clamp the cap securely in place owing to the softness of the metal, especially where the cap is clamped on the bottle by forcing the edge of the skirt inward instead of spinning; and in order to strengthen the engaging part, and at the same time, provide for inequalities in the bottle, I provide the construction illustrated in Figs. 7 and 8, in which the cap 9ᵇ, is provided with a flange or skirt, with an inwardly-turned, open loop 15, at the bottom thereof, so proportioned that the edge of the loop will be practically in contact with the shoulder of the bottle when the cap is placed upon the same, as shown in Fig. 7. Then when the tool descends to force the skirt inward against the shoulder, the edge of the loop will engage the shoulder at 16, and as the skirt is forced inward the shoulder of the bottle will force the edge of the loop outward, the inner part of the loop bending to conform to the shoulder, as will be readily understood, thereby providing for inequalities in the bottle, and insuring close contact of the engaging means with the shoulder. This construction would be very desirable with aluminium stoppers, which is very desirable in use with beer; but the construction is also adapted to be used with a cap composed of tin plate, or other metal.

While I have described the gasket as being composed of rubber, I do not confine the invention to the use of that material, as prepared cork might be used owing to the fact that the contents of the bottle can not reach the gasket, or any other suitable material for gaskets can be used; nor do I confine myself to the use of paraffined cloth as described in relation to Fig. 2, as paraffined, or waxed paper might be used to advantage in many instances, and in some cases gum, or wax may be used to coat the cloth instead of paraffin.

Having thus described my invention what I claim as new and desire to secure by Letters Patent, is—

1. A bottle seal comprising a cap having a portion thereof depressed to form a seat for the gasket, a gasket mounted in said seat, said depressed part being greater in diameter than the mouth of the bottle whereby it will rest upon a part of the bottle lip.

2. A bottle seal comprising a cap having a portion thereof depressed to form a seat, a gasket clamped in said seat, said depressed portion being greater in diameter than the mouth of the bottle on which it is mounted.

3. A bottle seal comprising a cap having the central part depressed and returned upon itself to form a seat for the gasket, said depressed portion being greater in diameter than the mouth of the bottle on which it is mounted and adapted to rest upon a part of the bottle lip.

4. A bottle seal comprising a cap having a depressed portion returned upon itself to form a seat, a gasket clamped in said seat, and water proof material covering said depressed portion.

5. A bottle seal comprising a cap having a depressed portion, a gasket mounted on said depressed portion, and a sheet of waterproofed material covering said depressed portion, said depressed portion being greater in diameter than the mouth of the bottle on which it is mounted and adapted to rest upon a part of the bottle lip.

6. A bottle seal comprising a cap having a depressed portion returned upon itself to form a seat, a gasket clamped in said seat, and a sheet of paraffined material clamped between said gasket and seat and covering said depressed portion.

7. A bottle seal comprising a cap having a depressed center returned upon itself to form a seat, a gasket secured in said seat, said cap having a flange, or skirt with the edge thereof formed into an open loop, the free end of said loop being adapted to engage the shoulder of the bottle and to be conformed thereto in being clamped upon the bottle.

8. A bottle seal comprising a suitable cap and gasket, said cap having a flange or skirt with the edge thereof formed into an open loop, said loop being proportioned in size with reference to the bottle so that it will be engaged by the shoulder of the bottle and partially closed when the cap is being secured to the bottle.

9. A bottle seal comprising a suitable cap and gasket clamped upon a bottle, said cap having a flange or skirt with the edge thereof formed into a loop, said loop having the free edge thereof conformed to the shoulder of the bottle substantially as described.

In testimony whereof I have signed my name to this specification in the presence of two subscribing witnesses.

KING C. GILLETTE.

Witnesses:
  LAWRENCE BOND,
  MABEL E. WHITMAN.